United States Patent
Gilson

(10) Patent No.: US 9,326,036 B2
(45) Date of Patent: *Apr. 26, 2016

(54) FREQUENCY REDIRECTION FOR INBAND SIGNALING

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/219,386

(22) Filed: Mar. 19, 2014

(65) Prior Publication Data

US 2014/0289768 A1 Sep. 25, 2014

Related U.S. Application Data

(63) Continuation of application No. 13/328,193, filed on Dec. 16, 2011, now Pat. No. 8,719,859, which is a continuation of application No. 12/463,851, filed on May 11, 2009, now Pat. No. 8,104,058.

(51) Int. Cl.
| | |
|---|---|
| H04N 21/482 | (2011.01) |
| H04N 21/633 | (2011.01) |
| H04N 21/266 | (2011.01) |
| H04N 21/63 | (2011.01) |
| H04N 21/262 | (2011.01) |
| H04N 21/6332 | (2011.01) |
| H04H 20/26 | (2008.01) |
| H04N 21/235 | (2011.01) |
| H04N 21/236 | (2011.01) |
| H04N 21/2362 | (2011.01) |
| H04N 21/2385 | (2011.01) |
| H04N 21/2668 | (2011.01) |
| H04N 21/434 | (2011.01) |
| H04N 21/435 | (2011.01) |
| H04N 21/438 | (2011.01) |
| H04N 21/61 | (2011.01) |

(52) U.S. Cl.
CPC ............ *H04N 21/482* (2013.01); *H04H 20/26* (2013.01); *H04N 21/235* (2013.01); *H04N 21/2362* (2013.01); *H04N 21/2385* (2013.01); *H04N 21/23608* (2013.01); *H04N 21/262* (2013.01); *H04N 21/266* (2013.01); *H04N 21/2668* (2013.01); *H04N 21/26606* (2013.01); *H04N 21/434* (2013.01); *H04N 21/435* (2013.01); *H04N 21/4344* (2013.01); *H04N 21/4345* (2013.01); *H04N 21/4383* (2013.01); *H04N 21/6156* (2013.01); *H04N 21/63* (2013.01); *H04N 21/633* (2013.01); *H04N 21/6332* (2013.01)

(58) Field of Classification Search
None
See application file for complete search history.

(56) References Cited

U.S. PATENT DOCUMENTS

| | | | |
|---|---|---|---|
| 5,469,431 | A | 11/1995 | Wendorf et al. |
| 6,137,539 | A | 10/2000 | Lownes et al. |

(Continued)

OTHER PUBLICATIONS

European Search Report for EP10162208 dated Jan. 25, 2011.

*Primary Examiner* — Justin Shepard
(74) *Attorney, Agent, or Firm* — Banner & Witcoff, Ltd.

(57) ABSTRACT

A channel remapping pre-notification (RPN) message is transmitted in each of multiple frequencies prior to movement of data associated with one or more virtual channels to one or more different frequencies. The RPN message is also sent prior to transmission of a Virtual Channel Table (VCT) reflecting channel movement. If a receiving device is unable to find data associated with a selected channel subsequent to the channel movement, the stored RPN information can be used to identify a new frequency for that selected channel.

18 Claims, 3 Drawing Sheets

(56) References Cited

U.S. PATENT DOCUMENTS

| | | | |
|---|---|---|---|
| 6,775,843 B1* | 8/2004 | McDermott | 725/151 |
| 7,885,189 B2 | 2/2011 | Krause et al. | |
| 2002/0199207 A1 | 12/2002 | Thomas et al. | |
| 2006/0075434 A1 | 4/2006 | Chaney et al. | |
| 2009/0025038 A1* | 1/2009 | Sahasrabudhe | 725/50 |
| 2009/0187938 A1* | 7/2009 | de Heer et al. | 725/34 |
| 2010/0229193 A1 | 9/2010 | Zhang et al. | |

\* cited by examiner

FREQUENCY REDIRECTION FOR INBAND SIGNALING

CROSS-REFERENCE TO RELATED APPLICATIONS

This application is a continuation of U.S. patent application Ser. No. 13/328,193, entitled "Frequency Redirection For Inband Signaling" and filed Dec. 16, 2011, which is a continuation of U.S. patent application Ser. No. 12/463,851, entitled "Frequency Redirection For Inband Signaling" and filed May 11, 2009 (now U.S. Pat. No. 8,104,058), each of which is incorporated in its entirety by reference herein.

BACKGROUND

Numerous telecommunication system operators provide broadcast television and other types of programming to subscribers over a coaxial cable or other medium terminating at the subscriber location. Typically, the system operator will transmit different information streams to subscribers in each of multiple frequencies. For example, one frequency may carry a stream of digital data packets for one group of programming services, another frequency may carry a different information stream having digital data packets for a different group of services, etc. A service may be a cable television service (e.g., HBO), a broadcast network (e.g., NBC), a local television station, an audio-only music service, or any of various other service types. Each service is usually assigned a channel number. Because a channel number can be arbitrarily assigned to a service independently of the frequency carrying the data packets of that service, such a channel number is often referred to as a "virtual" channel.

When a user selects a virtual channel corresponding to a desired service, a Set Top Terminal (STT) or other receiving device must know the frequency carrying the information stream that includes data packets for that service. Accordingly, the system head end transmits a Virtual Channel Table (VCT) that maps each virtual channel to the frequency on which the service data corresponding to that channel is carried. The VCT is periodically transmitted in-band among program data packets on multiple frequencies. System operators routinely move data for virtual channels to different frequencies because of equipment issues, for network management, and for various other reasons. An STT or other receiving device thus monitors an information stream on a tuned frequency for a new VCT. If a new VCT is received, it is stored and used for subsequent virtual channel selections.

Because a revised VCT mapping channels to different frequencies is not transmitted until after channels have actually been moved, problems can occur. As one example, a user may currently be watching service X corresponding to channel 10 carried on frequency Y. The user's receiving device is thus tuned to frequency Y and extracting data packets associated with channel 10 from the information stream carried on frequency Y. If the system operator moves data for service X/channel 10 to frequency Z, the user's receiving device will still be tuned to frequency Y but will be unable to find data corresponding to channel 10. Until a new VCT is received, the receiving device will not know where to find data for channel 10. Moreover, the head-end may stop transmitting VCTs in frequency Y after channel 10 is moved to frequency Z. For example, frequency Y may be reassigned for a different use (e.g., as a Data over Cable System Interface Specification (DOCSIS) carrier) or may be taken out of use (e.g., because of an equipment failure). The receiving device may then be forced to enter a search mode and try to find a VCT on another frequency. In particular, the device will search for a new VCT by sequentially tuning to each of multiple frequencies for a predetermined amount of time until a new VCT is found. In some cases, this process could take 10 minutes or more.

One existing solution is to also transmit the VCT on a separate out-of-band (OOB) frequency that does not change. A STT or other receiving device can then include a second tuner that stays tuned to that OOB frequency. This solution requires additional hardware components, however, and increases costs.

SUMMARY

This Summary is provided to introduce a selection of concepts in a simplified form that are further described below in the Detailed Description. This Summary is not intended to identify key features or essential features of the invention.

In at least some embodiments, a channel remapping prenotification (RPN) message is transmitted in each of multiple frequencies prior to movement of data associated with one or more virtual channels to one or more different frequencies. The RPN message is also sent prior to transmission of a new or updated Virtual Channel Table (VCT), and information from the RPN message can be stored in memory by a receiving describer device. If a receiving device is unable to find data associated with a selected channel subsequent to the channel movement, the stored RPN information can be used to identify a new frequency for that selected channel. The stored RPN information can also be used to identify channels that were not moved. If data for a selected channel cannot be found on the frequency indicated by the stored RPN information, one or more frequencies associated with channels identified as not moved can be searched for a new VCT, thus avoiding the need to search all frequencies.

BRIEF DESCRIPTION OF THE DRAWINGS

Some embodiments of the present invention are illustrated by way of example, and not by way of limitation, in the figures of the accompanying drawings and in which like reference numerals refer to similar elements.

DETAILED DESCRIPTION

Figure 1:
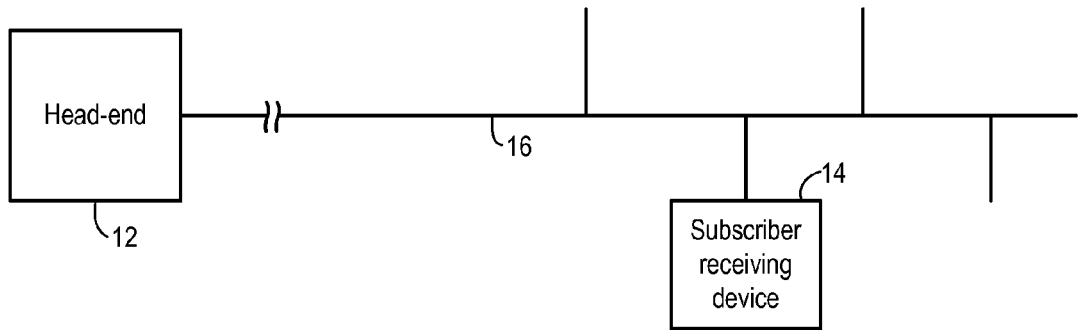
FIG. 1 is a block diagram showing a portion of a telecommunications system in which some embodiments can be implemented.

FIG. 1 is a block diagram showing a portion of a telecommunications system in which some embodiments can be implemented. A head-end 12 transmits data to multiple subscriber receiving devices 14 over a hybrid fiber coaxial (HFC) plant 16. For convenience, only one subscriber device 14 is shown in FIG. 1. In some embodiments, head-end 12 transmits data to subscriber devices over HFC plant 16 by frequency-division multiplexing (FDM) multiple QAM (quadrature amplitude modulation) modulated information streams onto 6 MHz-wide frequency bands centered on predefined nominal frequencies. Because such FDM and QAM techniques are well known, various elements of head-end 12 and HFC plant 16 are omitted from FIG. 1.

Figure 2:
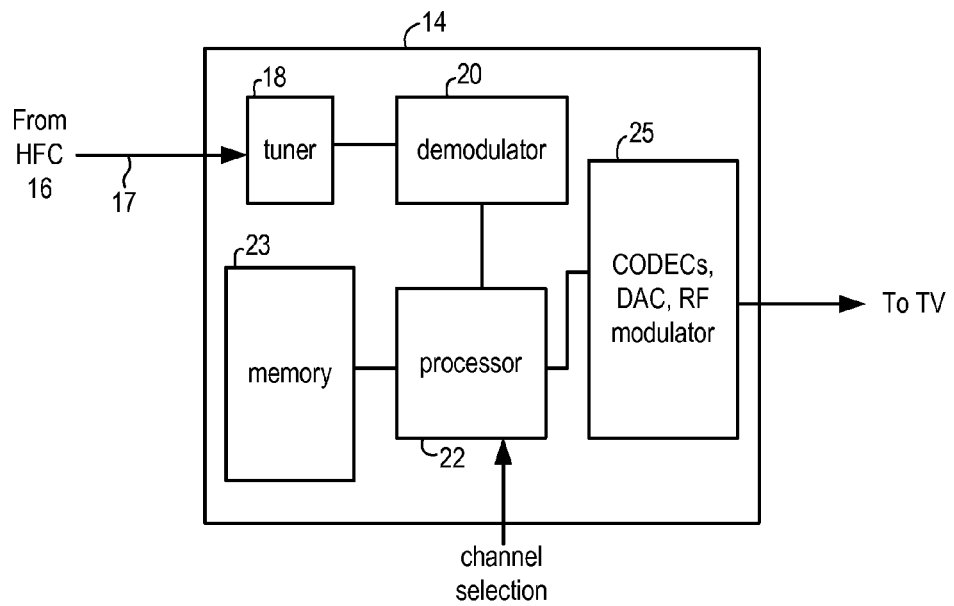
FIG. 2 is a block diagram of a receiving device according to at least some embodiments.

FIG. 2 is a block diagram of a receiving device 14. A coaxial cable 17 connects HFC plant 16 to an input terminal on device 14. Downstream signals from head-end 12 are received at a tuner 18. Under control of a processor 22, tuner 18 is selectively tunable to any of the frequency bands used to transmit information streams from head-end 12. For convenience, subsequent portions of this description (and the claims) will refer to tuning to a particular "frequency" or to carrying information on a particular frequency. As used herein (including the claims), the term "frequency" includes a frequency band having a particular width and centered on (or otherwise corresponding to) a nominal frequency (e.g., a 6 MHz-wide frequency band centered on a nominal frequency of 837 MHz). As also used herein (including the claims), "tuning," "setting" and "fixing" tuner 18 to a particular frequency refers to configuring tuner 18 to output a signal (e.g., a modulated information stream) carried on the tuned (or set or fixed) frequency.

Once tuner 18 is set to a particular frequency, the signal on the tuned frequency is provided by tuner 18 to a demodulator 20. Demodulator 20 then demodulates the signal carried on the tuned frequency and outputs a demodulated information stream of digital data to processor 22. Processor 22 then extracts various types of data from that demodulated information stream. The data in such a demodulated information stream may include packets of programming data associated with multiple virtual channels. For convenience, subsequent portions of this description will refer virtual channels simply as "channels."

For any given channel, the associated programming data may include coded audio data, coded video data, closed caption or other textual data, etc. In addition to programming data, information streams may also include system messages carrying various types of information. Examples of such information include a Virtual Channel Table (VCT) and a channel remapping prenotification. Such prenotifications are discussed in more detail below.

Information extracted from system messages in the demodulated information stream is stored by processor 22 in memory 23. Programming data is forwarded by processor 22 to component block 25 for additional processing. In some embodiments, component block 25 includes one or more application-specific integrated circuits implementing an audio and/or video CODEC (coder/decoder), a digital to analog converter and a RF modulator that outputs an analog television signal on a pre-defined over-the-air TV channel frequency. In this manner, a user can connect the output of device 14 to an input of a conventional television (not shown), tune that television to the pre-defined over-the-air TV channel (e.g., over-the-air channel 3 or over-the-air channel 4), and then select (virtual) channels for viewing by inputting channel selections into device 14.

Processor 22 executes machine readable instructions, stored in memory 23 and/or stored as hardwired logic gates within processor 22, so as to carry out operations described herein. Although individual blocks are shown for processor 22, memory 23, and other components of device 14, memory, computational and other operations of device 14 could be distributed across additional memories, processors and other electronic components within device 14. Memory 23 may include volatile and non-volatile memory and can include any of various types of storage technology, including one or more of the following: read only memory (ROM) modules, random access memory (RAM) modules, magnetic tape, magnetic discs, optical disk, flash memory, and EEPROM memory. Processor 22 may be implemented with any of numerous types of devices, including but not limited to one or more general purpose microprocessors, one or more application specific integrated circuits, one or more field programmable gate arrays, and combinations thereof.

Figure 3:
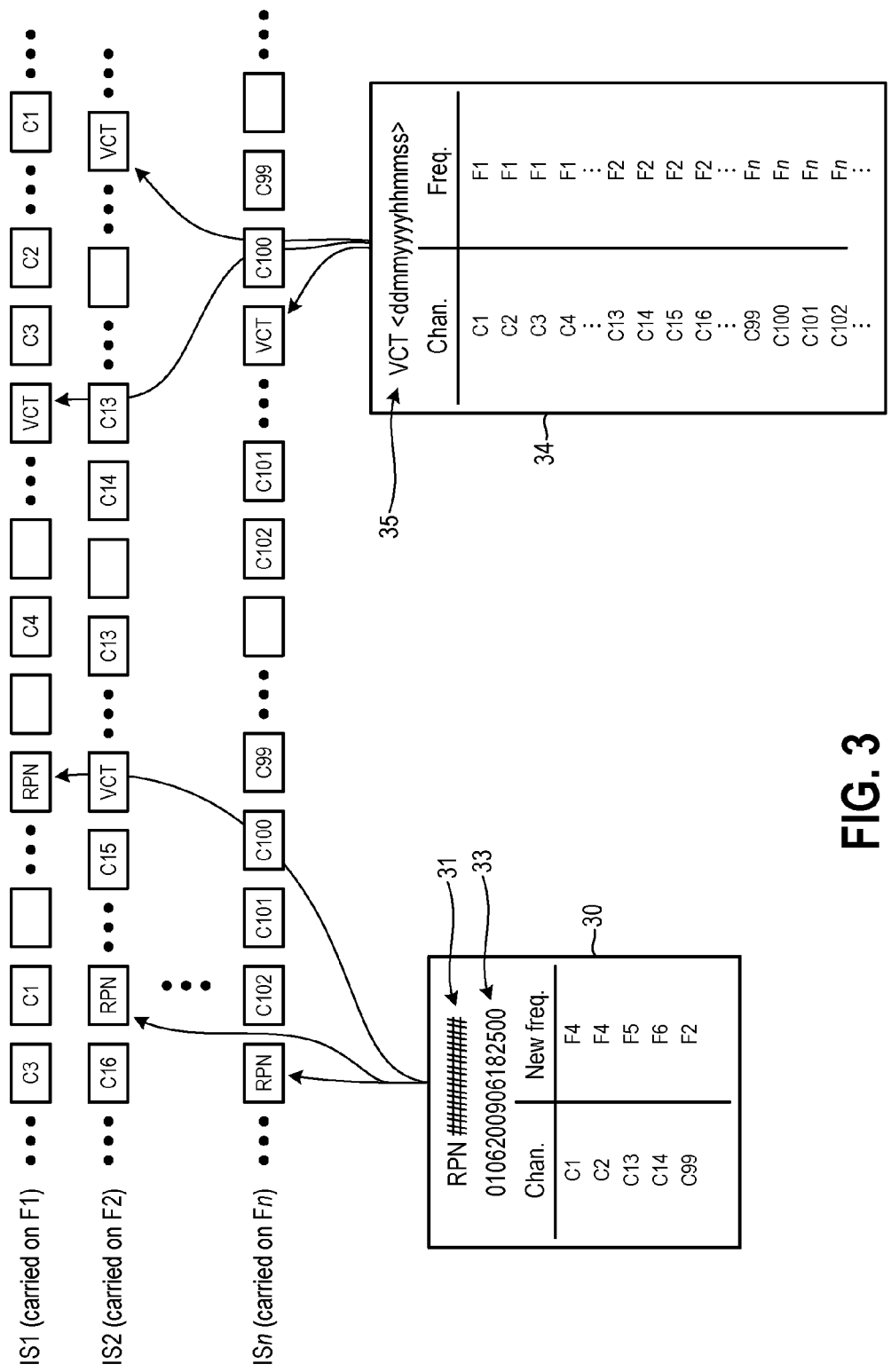
FIG. 3 is a block diagram showing information streams received by a receiving device in at least some embodiments.

FIG. 3 is a block diagram showing information streams carried in signals that device 14 receives from head-end 12. In the example of FIG. 3, different information streams are carried on each of n separate frequencies, where n is an arbitrary number. For example, frequency F1 carries a modulated information stream IS1 that includes digital data packets corresponding to channels C1, C2, C3 and C4. Frequency F2 carries an information stream IS2 that includes digital data packets corresponding to channels C13, C14, C15 and C16. Frequency Fn carries an information stream ISn that includes digital data packets corresponding to channels C99, C100, C101 and 102. Horizontal ellipses in information streams IS1, IS2 and ISn indicate the presence of additional data packets corresponding to additional channels and/or data packets carrying various system messages. In some embodiments, a single information stream may include data packets for 12 separate channels. The vertical ellipsis between IS2 and ISn indicates the presence of an arbitrary number of additional frequencies between frequencies 2 and n carrying additional information streams. In at least some embodiments, each of information streams IS1 through ISn is an MPEG-2 transport stream that is QAM modulated onto a frequency band that is 6 MHz in width and centered on a predefined nominal frequency between 52 MHz and 1002 MHz.

As used herein, a signal is considered "received" at particular point when the signal reaches that point, regardless of whether that signal is further processed or ignored. Thus, device 14 (and tuner 18) simultaneously receives all of modulated information streams IS1 through ISn. At any one time, however, tuner 18 of device 14 is only tuned to a single one of frequencies F1 through Fn, demodulator 20 is only demodulating the information stream carried in that tuned frequency, and processor 22 is only extracting information from that demodulated information stream. When a user of device 14 wants to watch programming associated with a particular channel, the user selects that channel (e.g., using a remote control not shown in FIG. 2) and a signal indicative of that selected channel is input into device 14 and communicated to processor 22. Processor 22 then consults a VCT stored in memory 23 and determines which frequency is carrying data associated with the selected channel. If tuner 18 is already tuned to that frequency, processor 22 begins extracting data packets for the newly-selected channel from the demodulated information stream. If tuner 18 is not yet fixed on the correct frequency, processor 22 sets tuner 18 to that frequency. Once the correct frequency is tuned, processor 22 begins extracting data packets for the newly-selected channel.

As indicated above, and as also seen in FIG. 3, head-end 12 also includes data packets in the information streams that provide various types of system management information to receiving devices. Some of those messages carry a VCT mapping each channel to the frequency carrying the programming data associated with that channel. Messages carrying a VCT are periodically transmitted in multiple information streams. In some embodiments, for example, each information stream having standard definition programming data includes VCT messages. When device 14 is initially powered on and boots, or when device 14 reboots after a power interruption, processor 22 enters a search mode. In this mode, processor 22 sets tuner 18 to frequency F1. If a VCT-carrying message is not detected before a predetermined time expires, processor 22 sets tuner 18 to the next frequency. If a VCT again cannot be found within a predetermined time, the next frequency is checked. This process continues until a VCT is found. Once a VCT is found, it is stored in memory 23 and device 14 is ready to use that stored VCT for normal operation. When in a normal operating mode, processor 22 continually monitors the demodulated information stream from a tuned frequency for VCT messages. Whenever processor 22 identifies a new VCT as different from a VCT stored in memory 23, processor 22 replaces the previously-stored VCT with the new VCT.

In at least some embodiments, a VCT reflecting a remapping of channels to new frequencies is not transmitted from head-end 12 until after that remapping has taken effect. In other words, head-end 12 will not transmit a VCT mapping channel X to frequency Z until after the data associated with channel X has been moved to the information stream carried on frequency Z. In some cases, a user-selected channel for which processor 22 is currently extracting programming data will not be one of the channels that is moved to another frequency. In such a case, processor 22 will simply continue to extract data for the selected channel and store the new VCT. If a user subsequently selects a moved channel after the new VCT is stored, processor 22 need only consult the new VCT. In other cases, however, the user-selected channel for which processor 22 is currently extracting programming data will be one of the channels that is moved. Accordingly, head-end 12 periodically transmits channel remapping pre-notification (RPN) messages containing information about channel movements that will be reflected in the channel/frequency mappings of a future VCT. Processor 22 also stores this information from RPN messages in memory 23. If a user-selected channel is moved to a different frequency while processor 22 is extracting programming data associated with that channel, processor 22 can then use that stored RPN information to identify the new frequency on which programming data for that channel can be found.

In some embodiments, head-end 12 transmits RPN messages more often as the effective time for a channel remapping approaches. In this manner, receiving devices that are turned on shortly before that effective time are more likely to be aware of the upcoming change. In some such embodiments, a receiving device will simply store the information contained in each RPN received by processor 22, with each newly-received RPN being used to overwrite the previously stored RPN. In other implementations, information from a RPN message is only stored if that RPN information is different from previously stored RPN information.

FIG. 3 shows an example of information contained in a RPN message 30 in some embodiments. A field 31 of RPN message 30 includes a predetermined code value ("##########") or other appropriate marker identifying message 30 as a RPN message. A field 33 of message 30 includes a time value indicating when channel remappings noted in message 30 will become effective. In the present example, channels C1 and C2 (currently contained in information stream IS1 on frequency 1) will be moved to an information stream on frequency F4 at 01062009182500 (1 Jun. 2009 at 6:25:00 pm). Similarly, channel C13 will be moved to an information stream carried on frequency F5, channel C14 will be moved to an information stream carried on frequency F6, and channel C99 will be moved to information stream IS2 carried on frequency F2. In some embodiments, the code value in field 31 and/or the field 31 value in conjunction with the RPN effective time in field 33 can be used to signal that RPN 30 updates a previously-sent RPN.

FIG. 3 also shows an example of a VCT message 34 carried in each of information streams IS1 through ISn. In addition to a table mapping each channel (C1, C2, etc.) to the frequency on which is carried the information stream having data associated with that channel, VCT message 34 includes a code value in a field 35. The code value in field 35 can be, e.g., the date and time (<ddmmyyyyhhmmss> on which the channel mappings reflected in VCT 34 became effective. By comparing the code value in field 35 with the code value in field 35 of a VCT stored in memory 23, processor 22 can determine whether a new VCT is different from a VCT stored in memory 23.

Figure 4:
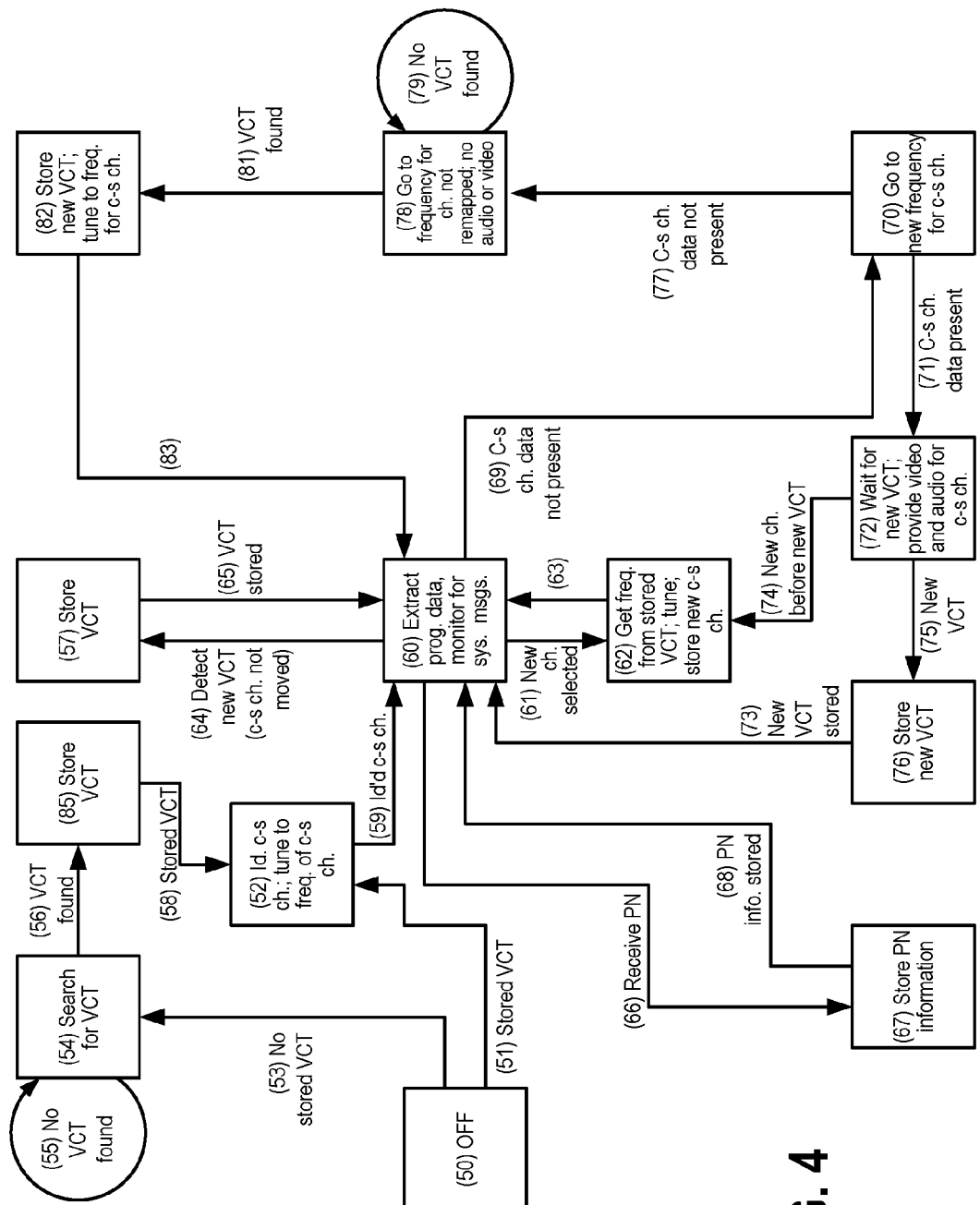
FIG. 4 is a state diagram showing operations performed by a processor of a receiving device according to at least some embodiments.

FIG. 4 is a state diagram showing operations performed by processor 22 according to some embodiments. In state 50, device 14 is turned OFF. The OFF condition of state 50 can be reached from any other state shown in FIG. 4 (e.g., by switching off device 14 when in one of those other states). For simplicity, however, arrows pointing from each of the other states to state 50 are omitted from FIG. 4.

When device 14 is turned on, processor 22 initially determines if a VCT is stored in memory 23. For example, memory 23 may be non-volatile, may have non-volatile components, or may remain powered when device 14 is turned off but remains connected to a wall outlet or other power source. Device 14 is then able to retain a VCT that was stored in memory 23 before device 14 was previously turned off. If a VCT is found in memory 23, processor 14 transitions on path 51 to state 52. State 52 is described below. If processor 22 does not find a VCT in memory 23 when device 14 is turned on, processor 22 instead transitions on path 53 to a search mode in state 54. When initially reaching state 54, processor 22 sets tuner 18 to frequency F1 and examines the resulting demodulated information stream for a VCT message. If no VCT is found after a predetermined amount of time, or if no information stream can be found on frequency F1, processor 22 repeats state 54 for the next frequency. This is shown by loop 55. This continues for additional frequencies until processor 22 finds a VCT. Once a VCT is found, processor 22 transitions on path 56 to state 85. In state 85, processor 22 stores the newly found VCT in memory 23. After storing the VCT, processor 22 proceeds on path 58 to state 52.

In state 52, processor 22 identifies the currently-selected channel (c-s ch.). In at least some embodiments, processor 22 stores each channel selected by a user as the currently-selected channel. The currently-selected channel is stored in memory 23 and remains in memory 23 when device 14 is turned off. If there is a currently-selected channel value stored in memory 23 when processor 22 reaches state 52, that channel value represents the channel last selected by a user before device 14 was previously turned off. If there is no currently-selected channel value stored in memory 23 (e.g., if device 14 was never previously activated), processor 22 stores C1 or some other default value as the currently-selected channel. Once a currently-selected channel is obtained, processor 22 consults the VCT in memory 23 and determines the frequency on which data for the currently-selected channel is carried. Processor then sets tuner 18 to that frequency and transitions along path 59 to normal operations in state 60.

While conducting normal operations in state 60, processor 22 extracts programming data associated with the currently-selected channel from the demodulated information stream obtained from the currently-tuned frequency. That extracted programming data is forwarded to component block 25 (FIG. 2) for further processing, as previously discussed. If processor 22 receives an indication that a user has selected a new channel while processor 22 is in state 60, processor 22 transitions to state 62 on path 61. In state 62, processor 22 consults the VCT in memory 23 and determines the frequency on which programming data associated with the newly-selected channel is carried. Processor 22 then sets tuner 18 on the determined frequency if that frequency is different from the tuned frequency to which tuner 18 is currently set. Processor 22 also stores the newly-selected channel as the new currently-selected channel. Processor 22 then returns on path 63 to state 60 and begins extracting programming data associated with the new currently-selected channel. In some embodiments, processor 22 also stores the previously-selected channel in memory 23 (i.e., the channel that is being replaced by the newly-selected channel) as the "last channel." With the stored last channel value, processor 22 may also set a flag indicating whether processor 22 was able to extract programming data for the last channel at the time of receiving a new channel selection. Processor 22 may sometimes use this last channel value and flag in a manner described below.

Processor 22 also monitors the demodulated information stream for various systems messages while in state 60. For example, processor 22 may detect a message with a new VCT that does not remap the currently-selected channel (i.e., if the currently-selected channel has not been moved to a new frequency). If processor 22 detects a system message with a new VCT while data for the currently-selected channel is still found on the currently-tuned frequency, processor 22 proceeds on path 64 to state 57. Processor 22 stores the newly-received VCT in memory 23 and then returns to state 60 on path 65.

While in state 60, processor 22 may also detect a RPN message such as message 30 of FIG. 3. Upon detecting a RPN message, processor 22 proceeds on path 66 to state 67. Processor 22 then stores information from the detected RPN message in memory 23 and returns to state 60 along path 68.

If a currently-selected channel is moved to a different frequency while processor 22 is in state 60, processor 22 will no longer find programming data for the currently-selected channel in the information stream demodulated from the currently-tuned frequency. For example, processor 22 may be examining the demodulated information stream received from demodulator 20 for packets containing a Program IDentifier (PID) corresponding to the currently selected channel. If packets with the correct PID can not be found after a predetermined amount of time, processor 22 will conclude that data for the currently-selected channel is no longer being carried on the currently-tuned frequency. If this occurs, processor 22 transitions along path 69 to state 70. Processor 22 may also be unable to find programming data for the currently-selected channel if a user selects a channel that has been moved to a new frequency before processor 22 detects and stores a VCT mapping that channel to its new frequency. For example, the following sequence could occur, where T0 is before T1, T1 is before T2, T2 is before T3, and T3 is before T4:

Time T0: Processor 22 transitions from state 67 to state 60 after storing RPN information from message 30 (FIG. 3) about upcoming moves of channels C1, C2, C13, C14 and C99.

Time T1: Moves of channels C1, C2, C13, C14 and C99 take effect while channel C15 (not moved) is the currently-selected channel.

Time T2: Before receiving a new VCT in IS 2 on frequency F2 (see FIG. 3), processor 22 receives an indication that a user has selected channel C1. Processor 22 transitions to state 62, obtains frequency F1 for channel C1 from the currently stored (and out-of-date) VCT in memory 23. Processor 22 sets tuner 18 to frequency F1.

Time T3: Upon returning to state 60, processor 22 cannot find programming data for channel C1 in frequency F1).

Time T4: Processor 22 transitions to state 70.

Processor 22 could also transition to on path 69 to state 70 immediately upon reaching state 60 after device 14 is turned on, as illustrated by the following example (where T5 is before T6, etc.):

Time T5: Device 14 is turned on. Processor 22 is in state 60 and currently-selected channel is C25 carried on frequency F6.

Time T6: Processor 22 detects an RPN message, transitions to state 67 and stores information from the RPN message. The information indicates C25 will be moved to frequency F7 at time T9.

Time T7: Processor 22 returns to state 60.

Time T8: Device 14 is turned off and transitions to state 50.

Time T9: Channel C25 is moved frequency F7.

Time T10: New VCT reflecting remapping of C25 to F7 is received at device 14, but because device 14 is turned OFF, the new VCT is not extracted or stored.

Time T11: Device 14 is turned on, processor 22 finds the now out-of-date VCT in memory 23 and transitions to state 52.

Time T12: Processor 22 determines from memory 23 that C25 is the currently-selected channel and sets tuner 18 to frequency F6.

Time T13: Processor 22 transitions to state 60 and cannot find C25 programming data.

Time T14: Processor 22 transitions from state 60 on path 69 to state 70.

In state 70, processor 22 consults memory 23 and obtains RPN information stored prior to the movement of the currently-selected channel. From that RPN information, processor 22 determines the new frequency for the currently-selected channel. Processor 22 then sets tuner 18 to that new frequency and looks for data associated with the currently-selected channel. If such data is found, processor transitions on path 71 to state 72. In state 72, processor waits for a new VCT on the new frequency. While waiting, processor 22 outputs audio and video data for the currently-selected VC. Once a new VCT is detected on the new frequency, that new VCT is stored in memory 23 (state 76 reached on path 75), and processor 22 transitions to state 60 on path 73. If processor 22 receives an indication of a new user channel selection while in state 72, but before detecting the new VCT, processor 22 transitions to state 62 on path 74.

Returning to description of state 70, processor 22 may in some cases not find data for the currently-selected channel after tuning tuner 18 to a new frequency indicated by stored RPN information. For example, there may have been a head-end equipment failure between the time the last RPN information was stored and the time when the currently-selected channel was moved to a different frequency. As another example, there may have been an error in the RPN information last stored by processor 22. If processor 22 cannot find data for the currently-selected channel while processor 22 is in state 70, processor 22 proceeds on path 77 to state 78.

In state 78, processor 22 selects another frequency and attempts to find a new VCT. While in state 78, no audio or video data is output by processor 22 to component block 25 (FIG. 2). Instead, processor 22 causes a message (e.g., "one moment please" or "channel temporarily unavailable") to be output from component block 25 for display on a connected television until the frequency for the currently-selected channel can be found and programming data for the currently-selected channel extracted. In some embodiments, processor 22 first determines in state 78 if it was extracting programming data for the last selected channel prior to selection of the currently-selected channel. Processor 22 makes this determination using the last channel value and flag described above.

If processor 22 was extracting programming data for the last selected channel prior to selection of the currently-selected channel, processor 22 consults the VCT currently stored in memory 23 and obtains the frequency for the last channel, sets tuner 18 to that frequency, and attempts to detect a VCT. If a VCT is detected, processor 22 transitions on path 81 to state 82 (discussed below). If processor 22 does not detect a VCT within a predetermined period, or if it was determined that programming data for the last channel was not being extracted prior to selection of the currently-selected channel, processor 22 consults RPN information in memory 23 to identify one or more channels for which that RPN information does not indicate a pending move to a different frequency. In some embodiments, processor creates a search list by copying a list of all channels and then deleting each channel identified in the currently-stored RPN information. Processor 22 then sequentially searches for a new VCT in frequencies mapped to channels in that list by the currently stored VCT. As indicated by loop 79, processor 22 remains in state 78 until a new VCT is detected.

Once a new VCT is detected in state 78, processor 22 transitions to state 82 and stores the new VCT in memory 23. Processor 22 then determines the frequency for the currently-selected channel from that new VCT, sets tuner 18 to the frequency mapped to the currently-selected channel by the new VCT, and begins outputting programming data to component block 25. Processor 22 then transitions back to state 60 on path 83.

In some embodiments, a head-end begins transmitting RPN messages several days or several weeks prior to a planned movement of channels to different frequencies. In at least some such embodiments, those RPN messages are transmitted on every frequency in which a VCT is transmitted. As indicated above, RPN messages can be transmitted more often as the effective time of channel movement approaches. Moreover, RPN messages can include information in addition to that shown in FIG. 3. In some embodiments, for example, an RPN message can include all of the information that will be included in a VCT that will be sent after the channel movements become effective.

In some additional embodiments, processor 22 is configured in state 78 to first check a currently-tuned frequency for a VCT. If a VCT is not received after a predetermined amount of time, processor 22 then determines if it was extracting programming data for the last selected channel prior to selection of the currently-selected channel. If so, processor 22 consults the VCT currently stored in memory 23 and obtains the frequency for the last channel, sets tuner 18 to that frequency, and attempts to detect a VCT. If a VCT is again not received after a predetermined amount of time, or if it was determined that programming data for the last channel was not being extracted prior to selection of the currently-selected channel, processor 22 consults RPN information in memory 23 to identify one or more channels for which that RPN information does not indicate a pending move to a different frequency, and begins checking frequencies corresponding to those unmoved channels for a new VCT.

In some embodiments, processor 22 transitions from state 78 to state 54 if a new VCT cannot be found in any of the frequencies associated with channels that the stored RPN information indicates were not moved.

As can be appreciated from the foregoing, various embodiments allow a receiving subscriber device to find data for a desired channel after that channel is moved to a different frequency, and without using a separate tuner dedicated to an 00B frequency. By avoiding the need for a second tuner, hardware costs for a receiving device can be reduced. Although cost reduction can be beneficial in many types of subscriber receiving devices, such reduction is particularly advantageous for certain limited function receiving devices that may not be manufactured in large numbers. One example of such a device is a digital-to-analog converter that might be provided to subscribers who do not wish to pay for a full-function set-top box, and who wish to watch CATV programming on a conventional television that requires analog RF input.

Embodiments of the invention include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a receiving device to carry out operations such as are described herein. As used herein (including the claims), a machine-readable storage medium is a physical structure that can be touched by a human. A modulated signal would not by itself constitute a machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the invention.

The invention claimed is:

1. A method, comprising:
    tuning, by a computing device comprising at least one tuner, to a first channel at a first frequency;
    responsive to a determination that data associated with the first channel is absent on the first frequency:
        determining a second channel based on first information indicating one or more channels that are scheduled to change frequency; and
        tuning to the second channel at a second frequency different from the first frequency;
    receiving second information on the second channel; and
    tuning, based on the second information, to the first channel at a third frequency that is different from the first frequency and the second frequency.

2. The method of claim 1, wherein the second information comprises information associating each of a plurality of channels comprising the first channel with one of a plurality of frequencies comprising the third frequency.

3. The method of claim 1, wherein each of the first channel and the second channel is a virtual channel.

4. The method of claim 1, wherein the first information comprises an indication of a scheduled future time at which the one or more channels are scheduled to change frequency.

5. The method of claim 4, wherein the second information comprises an indication of a past time at which a mapping of frequencies to a plurality of channels comprising the first channel became effective.

6. The method of claim 1, further comprising:
determining a set of a plurality of channels;
deleting from the set the one or more channels indicated by the first information as scheduled to change frequency; and
determining, after the deleting, the second channel as being part of the set.

7. The method of claim 1, wherein the determining the second channel based on the first information comprises determining, based on the first information, that the second channel is not scheduled to change frequency.

8. The method of claim 1, wherein the second channel is different from the one or more channels.

9. The method of claim 1, further comprising determining the second channel as a channel that is not indicated by the first information as being scheduled to change frequency.

10. A method, comprising:
receiving, by a computing device comprising at least one tuner, first information indicating a future frequency remapping of one or more channels;
tuning, by the computing device, to a first channel at a first frequency;
tuning, by the computing device, responsive to determining that data associated with the first channel is absent on the first frequency, to a second channel that is determined, based on the first information, to remain at a second frequency after the future frequency remapping, wherein the second frequency is different from the first frequency;
receiving, by the computing device, second information on the second channel; and
tuning, by the computing device, based on the second information, to the first channel at a third frequency that is different from the first frequency and the second frequency.

11. The method of claim 10, wherein the second information comprises information associating each of a plurality of channels comprising the first channel with one of a plurality of frequencies comprising the third frequency.

12. The method of claim 10, wherein the first information comprises an indication of a scheduled future time at which the one or more channels are scheduled to change frequency.

13. The method of claim 12, wherein the second information comprises an indication of a past time at which a mapping of frequencies to a plurality of channels comprising the first channel became effective.

14. The method of claim 10, further comprising:
determining a set of a plurality of channels;
deleting from the set the one or more channels indicated by the first information; and
determining, after the deleting, the second channel as being part of the set.

15. A method, comprising:
tuning, by a computing device comprising at least one tuner, based on first information indicating a frequency mapping of a plurality of channels, to a first channel at a first frequency;
receiving second information indicating a frequency remapping of one or more of the plurality of channels;
responsive to determining that the first channel is absent from the first frequency, re-tuning, based on the second information, to the first channel at a second frequency different from the first frequency;
responsive to determining that the first channel is absent from the second frequency, tuning, based on the second information, to a second channel at a third frequency that is different from the first frequency and different from the second frequency; and
tuning, based on third information received via the second channel, to the first channel at a fourth frequency that is different from the first frequency, different from the second frequency, and different from the third frequency.

16. The method of claim 15, wherein the frequency mapping is a first existing frequency mapping, the second information indicates a future scheduled time of the frequency remapping, and the third information indicates a second existing frequency mapping.

17. The method of claim 15, further comprising causing, by the computing device, content of the first channel at the fourth frequency to be displayed.

18. The method of claim 15, further comprising determining the second channel, based on the second information, as a channel that is not scheduled to change frequency.

* * * * *